United States Patent [19]

Herrmann

[11] Patent Number: 4,840,262

[45] Date of Patent: Jun. 20, 1989

[54] CLUTCH PLATE

[75] Inventor: Gert Herrmann, Solingen, Fed. Rep. of Germany

[73] Assignee: Uni-Cardan AG

[21] Appl. No.: 113,059

[22] Filed: Oct. 26, 1987

[30] Foreign Application Priority Data

Nov. 3, 1986 [DE] Fed. Rep. of Germany ....... 3637382

[51] Int. Cl.$^4$ .............................................. F16D 3/80
[52] U.S. Cl. ............................ 192/106.2; 192/106.1; 464/24
[58] Field of Search ................ 192/106.2, 58 B, 106.1; 464/24, 68

[56]  References Cited

U.S. PATENT DOCUMENTS

| 2,316,820 | 4/1943 | Thelander | 192/106.2 |
|---|---|---|---|
| 2,337,134 | 12/1943 | Thelander | 192/106.2 |
| 3,651,903 | 3/1972 | Butler et al. | 188/290 |
| 4,208,928 | 6/1980 | Conseur et al. | 74/574 |
| 4,351,167 | 9/1982 | Hanke et al. | 192/106.2 X |
| 4,381,052 | 4/1983 | Maucher | 192/106.2 |
| 4,743,217 | 5/1988 | Tojima et al. | 192/106.2 X |

FOREIGN PATENT DOCUMENTS

| 2418831 | 10/1975 | Fed. Rep. of Germany . | |
|---|---|---|---|
| 2807824 | 8/1978 | Fed. Rep. of Germany . | |
| 3150877 | 7/1982 | Fed. Rep. of Germany . | |
| 3126695 | 1/1983 | Fed. Rep. of Germany . | |
| 3227004 | 1/1984 | Fed. Rep. of Germany . | |
| 3329420 | 2/1985 | Fed. Rep. of Germany | 464/24 |
| 3607240 | 9/1986 | Fed. Rep. of Germany | 192/106.2 |
| 0204320 | 12/1982 | Japan | 192/58 B |
| 0920299 | 4/1982 | U.S.S.R. | 464/24 |
| 692954 | 6/1953 | United Kingdom | 464/24 |

OTHER PUBLICATIONS

Antriebstechnik 10 (1971) No. 2, pp. 52-57, "Viskose-Kupplungen" K. Stübner.

Primary Examiner—Rodney H. Bonck
Attorney, Agent, or Firm—Toren, McGeady & Associates

[57]  ABSTRACT

A clutch plate comprises a hub 1, side plates 9 rotationally fast on the hub, a friction lining carrier plate 15 between the side plates and moveable rotationally relative thereto, which movement is resisted by circumferential springs 14, and a viscous coupling arranged to provide torsional damping between the lining carrier plate and side plates. The viscous coupling comprises a housing with an inner part 4 on the hub, and an outer part 15a rotatably supported on the inner part and rotationally fast with the lining carrier element, and a plurality of interleaved plates 5 operating in a viscous liquid. The viscous coupling is accommodated between axially separated parts 10 of the side plates 9.

3 Claims, 2 Drawing Sheets

CLUTCH PLATE

BACKGROUND TO THE INVENTION

1. FIELD OF THE INVENTION

This invention relates to a clutch plate for automotive use, the clutch plate comprising a hub for mounting on a shaft, a carrier plate for a friction lining and a torsional vibration damper operative between the lining carrier plate and the hub.

2. DESCRIPTION OF THE PRIOR ART

It is known to provide clutch plates with means for absorbing torsional shock loadings and damping torsional vibration. Most commonly, the lining carrier plate is supported for limited rotation relative to the hub of the clutch plate, a number of circumferentially disposed springs being arranged to resist such relative rotation. Damping is provided by friction elements engaging the lining carrier plate.

The use of friction elements for damping has a disadvantage in that their static coefficient of friction is higher than their dynamic coefficient of friction. This means that the torque required to cause relative movement in the clutch plate to commence is higher than that required to sustain such movement, up to the point at which further movement is prevented by the springs. Vibrations up to a certain magnitude are not satisfactorily damped.

SUMMARY OF THE INVENTION

It is the object of the present invention to provide a clutch plate with a vibration damper designed in such a way that high static friction and its attendant disadvantage does not occur, and yet which still provides effective damping under greater torsional vibrations or large shock loadings.

According to the invention, we provide a clutch plate comprising a hub; side plates rotationally fast with the hub; a lining carrier element supported between the side plates for limited rotational movement relative thereto; spring means for resisting such rotational movement; and a viscous coupling comprising a housing with an inner part rotationally fast with the hub, an outer part rotatably supported on the inner part and rotationally fast with the lining carrier element, and containing a viscous liquid and a plurality of interleaved plates alternately fast with the inner and outer parts.

In a clutch plate according to the invention, relative rotational movement between the side plates and lining carrier element causes such movement between the interleaved plates of the viscous coupling and hence a resistance to such movement due to shear forces in the viscous liquid (preferably a silicone oil) which at least partially fills the coupling. Such forces are approximately proportional to the speed of relative movement between the plates, and hence there is no disadvantageous high static friction as with a conventional friction damper. Even small torsional vibrations are effectively damped. For torsional vibrations of greater magnitude, effective damping is still maintained. The viscous coupling operates in a wear free manner and is not subject to changes in its damping effect which are unavoidable with friction dampers.

The spring means, which preferably is a generally conventional arrangement of circumferentially disposed springs occupying apertures in the side plates and lining carrier element, restores the lining carrier element to an intermediate rotational position relative to the side plates. When the clutch plate is transmitting torque an equilibrium position is reached at which the torque is balanced by the force of the springs. The viscous coupling does not transmit torque when such an equilibrium position is reached. When temperature increases, the pressure of the liquid in the viscous coupling increases and hence the damping effect of the viscous coupling.

Preferably the viscous coupling is accommodated in a generally annular space defined by radially innermost parts of the side plates, which parts are axially bent away from one another.

BRIEF DESCRIPTION OF DRAWINGS

The invention will now be described by way of example with reference to the accompanying drawings, of which.

DESCRIPTION OF PREFERRED EMBODIMENTS

Figure 1:
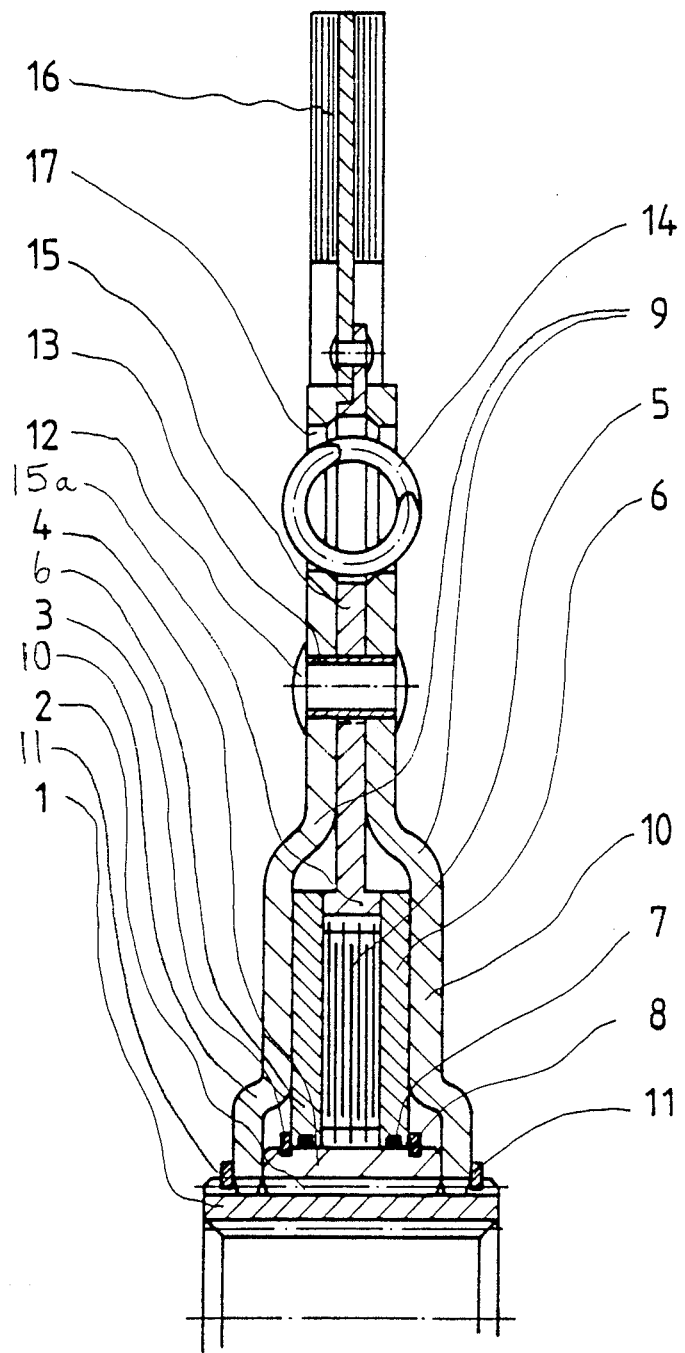
FIG. 1 is a section through part of a clutch plate according to the invention
Figure 2:
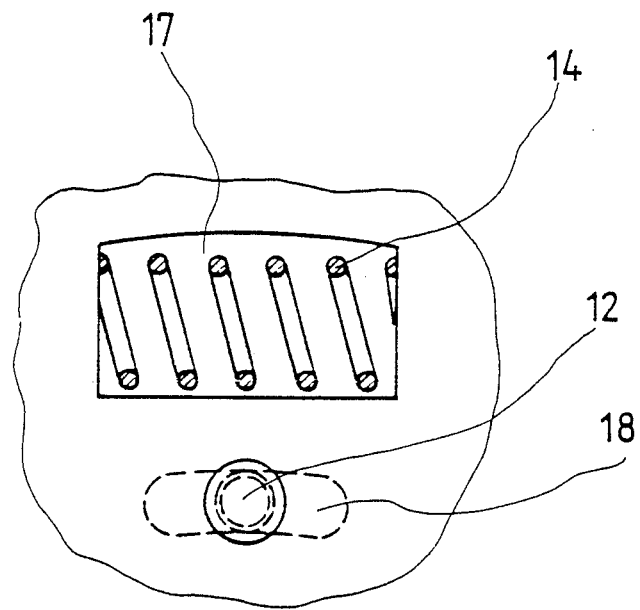
FIG. 2 is a axial view of part of the clutch plate.

Referring firstly to FIG. 1, the illustrated clutch plate comprises a hub 1 with a splined bore to be torque transmittingly received on a clutch shaft. The external surface of the hub 1 is also splined as indicated at 2, to receive and be rotationally fast firstly with an inner part 4 of a viscous coupling and secondly with two axially spaced side plates 9. Circumferential securing clips 11 hold the side plates on the hub. The radially innermost parts 10 of the side plates 9 are bent so as to be axially separated from one another by a distance sufficient to accommodate the viscous coupling which comprises a housing with, in addition to the inner part 4, axially spaced side parts 6 and an outer part 15a. The side parts 6 are rotatably supported on the inner part 4 and held thereon by circumferential securing clips 3, 8. The housing of the viscous coupling contains a viscous liquid e.g, a silicone oil and a plurality of interleaved plates 5 of which alternate plates are rotationally fast with the inner part 4 of the coupling and the other alternate plates are fast with the outer coupling part 15a. The plates and coupling parts are splined to provide the respective connections. Seals as 7 operative between the side parts 6 and the inner part 4 of the viscous coupling retain the viscous liquid therein. Such a construction for a viscous coupling is generally known.

The outer part 15a of the viscous coupling extends radially outwardly to form a lining carrier element 15, riveted to an outer annular part provided with friction linings 16. The lining carrier element 15 lies between radially outermost parts of the side plates 9, and a number of circumferentially extending coil springs 14 are disposed about the clutch plate, occupying generally rectangular apertures or windows 17 provided in the side plates 9 and the lining carrier element 15. Such coil springs bias the lining carrier element and side plates to a relative angular postion wherein the apertures 17 are aligned with one another and resiliently resist relative angular displacement from such position.

The side plates 9 are held together by circumferentially spaced rivets as 12, each passing through a respective spacer sleeve 13 extending between the sideplates. Such spacer sleeves prevent the side plates from being urged towards one another to clamp the lining carrier element therebetween and prevent the relative angular movement therebetween. The lining carrier element is provided with circumferentially extending apertures 18 where the spacer sleeves 13 pass therethrough, and the circumferential limits of such apertures provide stops to limit relative angular movement between the side plates and lining carrier element.

In use, torsional vibrations in the clutch plate cause relative rotational movement between the lining carrier element 15 and the side plates 9, which movement is resiliently resisted by the springs 14 and damped by the viscous liquid between the plates 5 of the viscous coupling. Under torque in use, an equilibrium position is reached at which the torque is balanced by the forces exerted by the springs 14, up to a limit determined by the extent of apertures 18 in the lining carrier element 15 through which spacer sleeves 13 pass. The viscous coupling provides damping up to such equilibrium position or limit, but does not further partake in torque transmission when such position or limit is reached. The viscous coupling does, of course, provide damping in respect of movements about the equilibrium position caused by torque fluctuations in use.

I claim:

1. A clutch plate comprising a hub; side plates rotationally fast with the hub; a lining carrier element supported between the side plates for limited rotational movement relative thereto; spring means for resisting such rotational movement; and a viscous shear coupling comprising a housing with an inner part rotationally fast with the hub, an outer part rotatably supported on the inner part and rotationally fast with the lining carrier element, and containing a viscous liquid and a plurality of interleaved plates alternately fast with the inner and outer parts, said viscous shear coupling transmitting torque only up to an equilibrium position at which torque on said lining carrier element is balanced by the forces exerted by said spring means.

2. A clutch plate according to claim 1, wherein the viscous coupling is accommodated in a generally annular space defined by radially innermost parts of the side plates, which parts are axially bent away from one another.

3. A clutch plate according to claim 1, wherein circumferentially extending apertures are provided in the lining carrier element; and further comprising circumferentially spaced rivets provided so as to pass through respective spacer sleeves extending between the side plates and hold the side plates together, the spacer sleeves being provided so as to pass through the extending apertures in the lining carrier element and limit relative annular movement between the side plates and the lining carrier element.

* * * * *